(12) United States Patent
Douma

(10) Patent No.: US 8,951,357 B2
(45) Date of Patent: Feb. 10, 2015

(54) DEVICE FOR WHISKING MILK AND METHOD FOR CLEANING SUCH A DEVICE

(75) Inventor: Sipke Theo Douma, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 625 days.

(21) Appl. No.: 12/995,692

(22) PCT Filed: Jun. 8, 2009

(86) PCT No.: PCT/IB2009/052421
§ 371 (c)(1),
(2), (4) Date: Jan. 10, 2011

(87) PCT Pub. No.: WO2009/150602
PCT Pub. Date: Dec. 17, 2009

(65) Prior Publication Data
US 2011/0094541 A1    Apr. 28, 2011

(30) Foreign Application Priority Data
Jun. 13, 2008  (EP) ..................................... 08158180

(51) Int. Cl.
*B08B 9/00*  (2006.01)
*B08B 9/02*  (2006.01)
*B08B 9/032* (2006.01)
*A47J 31/60* (2006.01)
*A47J 31/44* (2006.01)

(52) U.S. Cl.
CPC .............. *A47J 31/60* (2013.01); *A47J 31/4485* (2013.01)
USPC ................ 134/22.12; 134/22.18; 134/166 C; 134/169 C

(58) Field of Classification Search
CPC ............................... A47J 31/60; A47J 31/4485
USPC ......... 134/26, 22.1, 22.11, 22.18, 22.12, 133, 134/166 C, 169 C; 426/569, 474, 580, 590, 426/476, 477; 99/323.1, 453
See application file for complete search history.

(56) References Cited

U.S. PATENT DOCUMENTS

| | | | |
|---|---|---|---|
| 5,207,148 A * | 5/1993 | Anderson et al. | 99/281 |
| 5,498,757 A | 3/1996 | Johnson et al. | |
| 6,006,654 A | 12/1999 | Pugh | |
| 6,019,032 A * | 2/2000 | Arksey | 99/452 |
| 6,099,878 A * | 8/2000 | Arksey | 426/231 |
| 6,713,110 B2 | 3/2004 | Imboden et al. | |
| 2003/0172816 A1* | 9/2003 | Mahlich | 99/453 |

(Continued)

FOREIGN PATENT DOCUMENTS

| | | |
|---|---|---|
| EP | 1639925 A2 * | 3/2006 |
| GB | 2363343 A * | 12/2001 |
| WO | 2004004523 A2 | 1/2004 |

*Primary Examiner* — Alexander Markoff

(57) ABSTRACT

A device (1) comprises an intake duct (11) for taking in milk, an intake duct (15) for taking in a cleaning fluid, a central duct (13) in which both intake ducts (11, 15) are merging, and a pump (31) which is arranged in the central duct (13). Cleaning the device (1) involves filling both the central duct (13) and the milk intake duct (11) with the cleaning fluid. In particular, the pump (31) is a bi-directional pump, wherein filling the central duct (13) with the cleaning fluid is realized by operating the pump (31) in one direction while blocking the milk intake duct (11), and wherein filling the milk intake duct (11) with the cleaning fluid is realized by opening the milk intake duct (11) and operating the pump (31) in a reversed direction, wherein cleaning fluid is displaced from the central duct (13) to the milk intake duct (11).

7 Claims, 1 Drawing Sheet

(56) References Cited

U.S. PATENT DOCUMENTS

| | | | |
|---|---|---|---|
| 2004/0188428 A1* | 9/2004 | Policappelli | 219/689 |
| 2005/0172833 A1* | 8/2005 | Ioannone et al. | 99/453 |
| 2005/0223911 A1* | 10/2005 | Landolt | 99/455 |
| 2005/0233043 A1* | 10/2005 | Dirren | 426/569 |
| 2008/0163896 A1* | 7/2008 | Ioannone | 134/18 |
| 2009/0025762 A1* | 1/2009 | Coccia et al. | 134/166 C |
| 2009/0293733 A1* | 12/2009 | Martin et al. | 99/280 |
| 2011/0094541 A1 | 4/2011 | Douma | |
| 2013/0115350 A1 | 5/2013 | Majer | |

\* cited by examiner

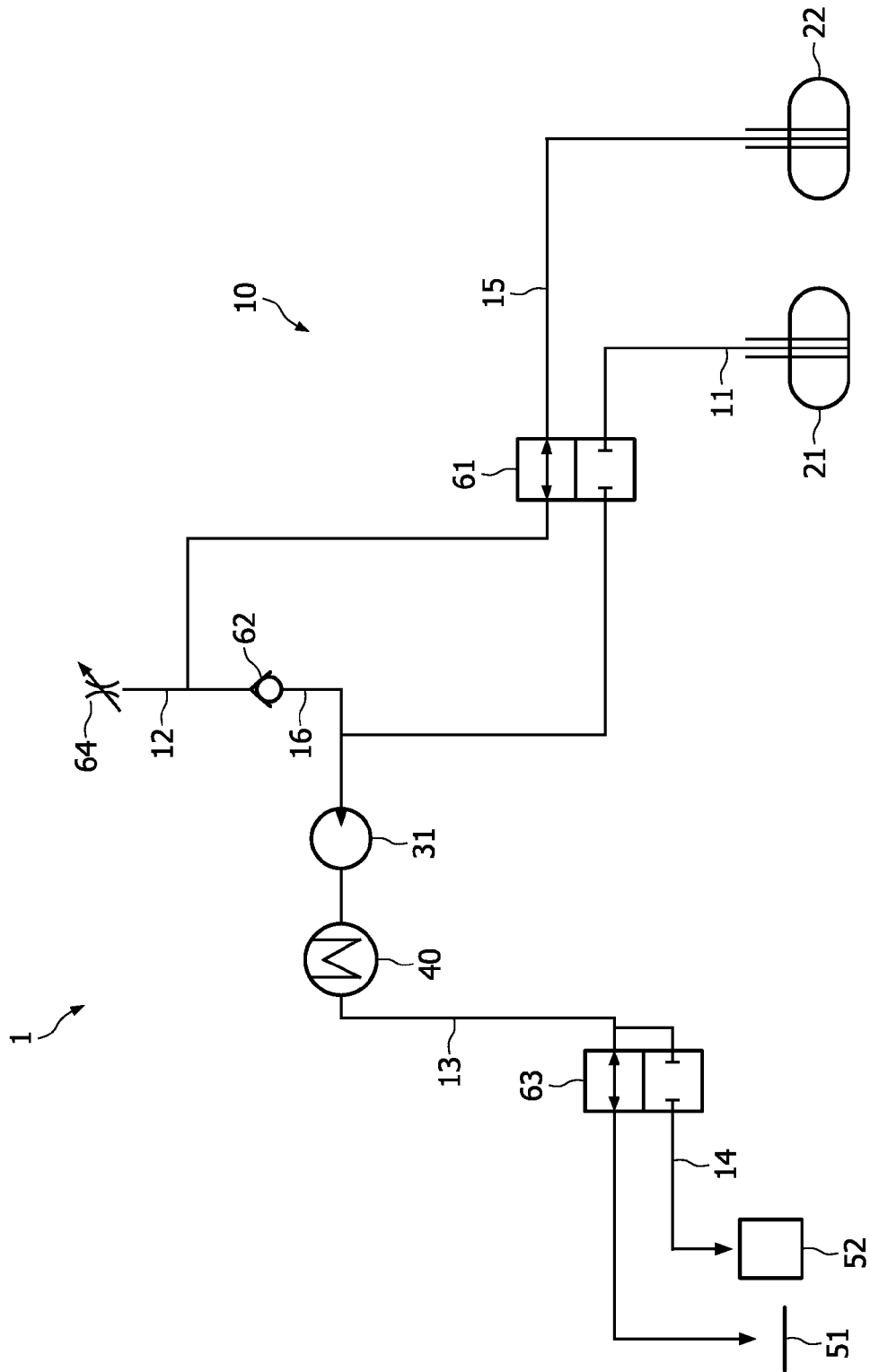

DEVICE FOR WHISKING MILK AND METHOD FOR CLEANING SUCH A DEVICE

FIELD OF THE INVENTION

The present invention relates to a device which is suitable to be used for whisking milk, which device comprises a duct system having an intake duct for taking in milk, an intake duct for taking in a cleaning fluid, and a central duct in which both the milk intake duct and the cleaning fluid intake duct are merging, and which device further comprises flow controlling means which are capable of assuming a position for blocking the milk intake duct and a position for allowing a flow of fluid to pass in the milk intake duct, and a pump which is arranged in the central duct. Furthermore, the present invention relates to a method for cleaning the device as mentioned.

BACKGROUND OF THE INVENTION

Whisking milk should be understood as being a process of frothing milk by mixing the milk with air without a use of steam. Although such a process is known, and devices have been developed for performing such a process, most devices which are suitable to be used for emitting milk froth and which are currently available in the market are adapted to use steam. In such devices, the steam is used for pumping the milk out of a container such as a cartridge or jug, heating the milk, pumping air, and pumping the obtained milk froth to an outlet of the device. However, using steam for making milk froth has disadvantages, as will be explained in the following.

A first disadvantage is that when steam is used, the milk is always heated. Therefore, in a situation in which it is desired to have cold milk froth, the froth needs to be cooled down after the frothing process has taken place. A second disadvantage is that in general, a steam supply is relatively difficult to control. A third disadvantage is that devices for generating steam need to be decalcified from time to time. A fourth disadvantage is that the use of steam is dangerous on the basis of the fact that it is a hot fluid which may cause injuries to a user. A fifth disadvantage is that the use of steam involves a construction which is relatively difficult to clean. It is a well-known fact that cleaning of a device for handling milk is very important, as milk residues may grow bad and spoil milk froth to be made in future applications of the device.

Using whisking overcomes the problems associated with using steam. However, known devices which are suitable for whisking milk require a lot of cleaning effort.

A device for whisking milk is known from US 2005/0233043. In particular, the device comprises a suction line and a pump, which are suitable to be used for suctioning cold milk from a container, and a continuous-flow heater for heating the milk, wherein the suction line is connected to an output line for delivering milk foam or a warm milk drink to another container such as a cup. Furthermore, the known device comprises an air supply line which opens into the suction line, and which serves for supplying air when it is desired to have milk foam.

After a process of producing milk foam or a hot milk drink, for the purpose of cleaning of the continuous-flow heater and the lines leading to and from the heater, a cleaning fluid can be introduced from a source via a valve and a line into the suction line, and pumped into the outlet line by means of the pump. US 2005/0233043 discloses that it is preferred if a certain quantity of water is pumped through the suction line after each flow of milk, so that a settling of milk residue can be prevented, especially in the continuous-flow heater. However, in the known device, a portion of the suction line, which is a portion extending between an end situated at the milk container and a non-return valve for preventing a back flow of milk, is not cleaned, as the line for supplying the cleaning fluid opens into the suction line at a position upstream of the non-return valve. Hence, it is possible for milk residue to settle in the said portion of the suction line, which is a disadvantage of the known device.

SUMMARY OF THE INVENTION

It is an object of the present invention to provide a device which is suitable to be used for whisking milk, which comprises a cleaning fluid intake duct, and which is constructed in such a way that it is possible to clean a milk intake duct of the device besides a central duct of the device in which the milk intake duct is merging, without the need of introducing a separate, additional cleaning system or any more components besides the duct system, flow controlling means and pump as mentioned earlier. This object is achieved by a device in which the pump is a bi-directional pump, i.e. a pump which is capable of performing pumping actions in two different directions. Consequently, during operation of a bi-directional pump, it is possible to change the direction of the pumping action whenever it is appropriate to do so.

On the basis of the presence of the cleaning fluid intake duct and the bi-directional pump in the device according to the present invention, it is possible to clean both the central duct and the milk intake duct by filling these ducts with cleaning fluid, wherein the cleaning process is performed in three subsequent cleaning stages. In particular, in a first cleaning stage, the pump is operated such as to perform a pumping action in a direction from an intake side of the duct system to an outlet side of the duct system, and the flow controlling means are put at a position for blocking the milk intake duct, wherein, in a second cleaning stage, the pump is operated in a reversed direction, and the flow controlling means are put at a position for allowing a flow of fluid to pass in the milk intake duct, and wherein, in a third cleaning stage, the pump is operated in the original direction again, and the flow controlling means are put at a position for blocking the milk intake duct again.

In the first cleaning stage, on the basis of the direction of the operation of the pump and the position of the flow controlling means as mentioned, it is achieved that the central duct is filled with cleaning fluid. In the second cleaning stage, the direction of the operation of the pump is reversed, and the flow controlling means are put at a position for allowing a flow of fluid to pass in the milk intake duct, so that cleaning fluid is drawn from the central duct and pumped to the milk intake duct. In the third cleaning stage, the central duct is completely filled with cleaning fluid by pumping the cleaning fluid from the cleaning fluid intake duct to the central duct once again. Summarizing, by having the three subsequent cleaning stages, it is achieved that the central duct is filled with the cleaning fluid first, that the milk intake duct is filled with the cleaning fluid at a somewhat later stage, wherein the cleaning fluid which is needed for filling the milk intake duct is taken from the central duct, and that the central duct is completely filled with cleaning fluid at a last stage. It is sufficient to have only one cleaning system, wherein filling of both the central duct and the milk intake duct with the cleaning fluid may be realized by having a single, bi-directional pump. Hence, in the device according to the present invention, there is no need for more space and additional components in order to minimize the cleaning effort for a user of the device, which is an important achievement of the invention.

In order to achieve that the milk intake duct gets completely filled with the cleaning fluid, while preventing the cleaning fluid from flowing beyond a free end of the milk intake duct, i.e. an end which is positioned in a milk container or the like, it is preferred if in the second cleaning stage, the pump is only operated for pumping a volume of cleaning fluid which corresponds to the volume of the milk intake duct, and wherein the operation of the pump is terminated as soon as this volume has passed the pump. It is to be understood that any suitable means for controlling the operation of the pump may be provided, so that it is possible to actually realize a required dosing of the cleaning fluid in practice.

Preferably, a process of cleaning the device according to the present invention is carried out each time the device has been operated for making a milk product such as milk froth or a milk beverage. Controlling means of the device may be adapted to start a cleaning action automatically, but it is also possible that the cleaning action is only started after a user of the device has provided appropriate input, for example by pressing a button.

With respect to the flow controlling means, it is noted that it is advantageous if these means are capable of assuming a position for blocking one of the milk intake duct and the cleaning fluid intake duct while leaving another of these ducts open. As a supply of milk during a cleaning action should be avoided, the flow controlling means are set in a position for blocking the milk intake duct during a cleaning action. On the other hand, in situations in which there is no need for a flow of cleaning fluid, the milk intake duct may be open. On the basis of the insight that mutually exclusive uses of the milk intake duct and the cleaning fluid intake duct are possible, it is found that it is not necessary to have separate means for blocking and opening each one of the ducts. Instead, costs may be saved by having flow controlling means which are associated with both ducts.

In an advantageous embodiment, the device according to the present invention further comprises a sieve, i.e. a component of perforated material or wire mesh, which is arranged at an outlet of the duct system, in particular the outlet for delivering a milk product intended for consumption by a user. On the basis of the fact that the device is equipped for cleaning its duct system, it is possible to have a sieve as mentioned, wherein there is no risk that the sieve gets contaminated by milk residues, as the sieve is automatically cleaned when a cleaning action is performed, and wherein there is no need for extra cleaning effort by a user of the device.

In most devices which are suitable to be used for frothing milk, there is a relation between a size of the milk bubbles and a temperature of the frothed milk. By applying a sieve, it is achieved that more constant froth quality can be realized, as the properties of the sieve are determining the bubble size in that case, rather than the temperature. The bubble size can be controlled in a better way, wherein this property of the froth is determined by properties of the sieve such as hole size, density of holes (i.e. amount of holes in a defined area), shape of the holes, and material of the sieve.

It is most practical to have two outlets in the milk whisking device, wherein one outlet may be used for actually delivering a milk product to a receptacle such as a cup, and wherein another outlet may be used for delivering residual milk and cleaning fluid to another receptacle such as a drip tray. A delivery of residual milk takes place as soon as a cleaning action is performed, as in that case, the residual milk is pushed out under the influence of a pumping action and a flow of cleaning fluid. A delivery of cleaning fluid takes place as soon as the device is operated to deliver a milk product, as in that case, the cleaning fluid needs to be removed from the milk intake duct and the central duct first, wherein this may be realized as a consequence of a new supply of milk. For sake of completeness, it is noted that in principle, it is possible to have only one outlet, wherein the user of the device is required to decide whether or not to put a cup at this outlet at a certain time, or an automated system is required for doing so. However, in order to avoid a situation in which the operation of the device should be monitored in order to put a cup at a position for receiving a milk product from the device at exactly the right time, it is preferred to have two separate outlets.

In an embodiment of the device in which two outlets as mentioned in the foregoing are present, this device comprises an outlet duct which is merging in the central duct at a position downstream of the pump which is arranged in the central duct, and flow controlling means which are capable of blocking one of the outlet duct and the central duct at a position downstream of the connection of the outlet duct to the central duct while leaving another of these ducts open. When a cleaning action is performed in this embodiment of the device, the flow controlling means are put at a different position than a position which is set during a preceding process of operating the device for emitting a milk product, so that milk residue and cleaning fluid may be discharged through the other outlet than the outlet which serves for emitting the milk products.

In a practical embodiment, the device according to the present invention comprises a drip tray for receiving waste fluid. Examples of waste fluid are milk residues which are forced to flow from the duct system of the device during a cleaning action of the device, and cleaning fluid which is forced to flow from the duct system of the device during a process of preparing a milk product. When the device comprises an outlet duct as described in the foregoing, it is advantageous if one of the central duct and this outlet duct is arranged for emitting fluid to the drip tray. Furthermore, in such a case, it is advantageous if a sieve is arranged in another of the central duct and the outlet duct, as that duct is apparently used for emitting the milk products.

The device according to the present invention may further comprise heating means which are arranged in the central duct, so that it is possible for the device to deliver hot milk froth or a hot milk drink. In order to have a choice between performing a heating process, or not, it is possible to control the operation of the heating means on the basis of the desired temperature of the milk product to be delivered. Another option is the application of a bypass duct which is connected in parallel to a portion of the central duct where the heating means are located, and the application of flow controlling means which are capable of assuming a position for blocking one of the bypass duct and the portion of the central duct where the heating means are located, while leaving another of these ducts open may also be provided. In such a case, when a cleaning action is carried out, it is only necessary to supply the cleaning fluid to the bypass duct when the heating means have not been used during the preceding operation of the device. Cleaning the right path through the device is achieved when the flow controlling means are kept at a position which has been set during a preceding process of operating the device for emitting milk froth or a milk beverage.

With respect to the pump, it is noted that this component of the device according to the present invention may be of any suitable type, for example a pump which is adapted to perform a pumping action based on the plunger principle, or a pump which is adapted to perform a pumping action based on the gear principle.

It is noted that in view of the costs, it is advantageous to apply check valves at positions where flow controlling means need to be present in the device according to the present invention, as check valves are relatively cheap. For example, the device may further comprise an air intake duct for taking in air, which merges in the central duct at the same position as the cleaning fluid intake duct, wherein a portion of the cleaning fluid intake duct and a portion of the air intake duct are joined to one duct, and a single-directional check valve may be arranged in this one duct in order to prevent a flow of cleaning fluid to the air intake duct and/or the cleaning fluid intake duct when the pump is operated in a reversed direction for pumping cleaning fluid to the milk intake duct.

The above-described and other aspects of the present invention will be apparent from and elucidated with reference to the following description of various embodiments of a milk whisking device according to the present invention.

BRIEF DESCRIPTION OF THE DRAWING

The present invention will now be explained in greater detail with reference to FIG. 1, which diagrammatically shows components of a milk whisking device according to a preferred embodiment of the present invention, and which also illustrates the configuration of the components in the device.

DETAILED DESCRIPTION OF EMBODIMENT

FIG. 1 diagrammatically shows a set-up of a milk whisking device 1 according to a preferred embodiment of the present invention. In general, a milk whisking device is suitable to be used for coffee, espresso and cappuccino appliances, which does not alter the fact the milk whisking device 1 may be used in other contexts as well. In any case, the milk whisking device 1 is adapted to make milk froth by taking in milk and air and allowing these two ingredients of milk froth to mix. The milk froth is obtained by performing a whisking process, wherein the milk is frothed without a use of steam.

The milk whisking device 1 comprises the following components, as illustrated by FIG. 1:

a milk intake duct 11 for taking in milk from a milk reservoir 21;

an air intake duct 12 for taking in air;

a central duct 13 in which both the milk intake duct 11 and the air intake duct 12 are merging;

a bi-directional pump 31 which is arranged in the central duct 13 at a position downstream of positions where the milk intake duct 11 and the air intake duct 12 are connected to the central duct 13;

a heater 40 which is arranged in the central duct 13 at a position downstream of the pump 31;

an outlet duct 14 which is merging in the central duct 13 at a position downstream of the heater 40;

a cup support 51 which is positioned at a free end of the central duct 13;

a drip tray 52 for receiving waste fluid, which is positioned at a free end of the outlet duct 14;

a cleaning fluid intake duct 15 for taking in a cleaning fluid such as water from a cleaning fluid reservoir 22, which merges in the central duct 13 at the same position as the air intake duct 12; and a duct 16 where the air intake duct 12 and the cleaning fluid intake duct 15 are joined, and through which both ducts 12, 15 are merging in the central duct 13.

All ducts 11, 12, 13, 14, 15, 16 as mentioned are part of a duct system 10 of the milk whisking device 1. For the purpose of ensuring that in every use of the device 1, an appropriate fluid path is created in the device 1, the device 1 is equipped with a number of valves. In FIG. 1, three valves are shown, namely a first valve 61 which is capable of switching between two different positions, which is arranged such as to block the cleaning fluid intake duct 15 while leaving the milk intake duct 11 open in a first position and to block the milk intake duct 11 while leaving the cleaning fluid intake duct 15 open in a second position, and which will hereinafter be referred to as milk/cleaning fluid valve 61;

a second valve 62 which is arranged in the duct 16 where the air intake duct 12 and the cleaning fluid intake duct 15 are joined, which is a single-directional check valve, and which will hereinafter be referred to as cleaning fluid/air valve 62; and a third valve 63 which is capable of switching between two different positions, which is arranged such as to block an end portion of the central duct 13 while leaving the outlet duct 14 open in a first position and to block the outlet duct 14 while leaving the end portion of the central duct 13 open in a second position, and which will hereinafter be referred to as outlet valve 63.

For the purpose of controlling the various components of the milk whisking device 1, in particular the pump 31, the heater 40, the milk/cleaning fluid valve 61 and the outlet valve 63, any suitable type of controlling means may be applied. For example, the device 1 may be equipped with a microcontroller (not shown) for carrying out one of a number of predetermined routines of making various milk products, depending on input provided by a user, and subsequently performing a cleaning action. In a process of making a milk product, the pump 31 serves as a milk froth generator, as this pump 31 is adapted to pumping milk and air, and mixing these two fluids. With respect to the intake of air, it is noted that an adjustable restriction 64 as shown in FIG. 1 may be arranged at an inlet side of the air intake duct 12, and that this restriction 64 may be controlled such as to have a larger supply or a smaller supply of air, depending on the desired properties of a milk product which is to be made by means of the milk whisking device 1.

The various components of the milk whisking device 1 are cleaned by means of cleaning fluid each time a process of making a milk product has been carried out. Therefore, at the start of each process of making a milk product, the duct system 10 of the device 1 is filled with the cleaning fluid. The way in which this is achieved is explained later. First, a process of making a milk product is further explained.

When a user decides to have a milk product, he/she places a cup or another suitable receptacle (not shown) on the cup support 51 and activates the milk whisking device 1. In the device 1, the pump 31 is activated, the milk/cleaning fluid valve 61 is put to a position for opening the milk intake duct 11 and closing the cleaning fluid intake duct 15, the adjustable restriction 64 is put to an appropriate position, and the outlet valve 63 is put to a position for blocking an end portion of the central duct 13 while leaving the outlet duct 14 open. When the user desires to obtain a warm drink, the heater 40 is activated as well. On the other hand, when the user desires to obtain a cold drink, the heater 40 is kept in a deactivated state.

Under the influence of the pump 31, milk is suctioned from the milk reservoir 21 and is made to flow through the central duct 13. Furthermore, air is suctioned in the central duct 13 as well. In the process, cleaning fluid which is present in the milk intake duct 11 and the air intake duct 12 is displaced by the flows of milk and air, respectively. Due to the action of the pump 31, the cleaning fluid is displaced towards an outlet side of the duct system 10. Therefore, the outlet valve 63 is in a position for blocking an end portion of the central duct 13 while leaving the outlet duct 14 open, as in this position of the outlet valve 63, it is achieved that the cleaning fluid flows to the drip tray 52 and is received there.

In the pump 31, the actual process of mixing the milk and the air takes place, so that milk froth is formed. The milk froth is pumped towards the outlet side of the duct system 10. All this time, cleaning fluid flows from the outlet duct 14 and is received by the drip tray 52. However, as soon as a front of the milk froth reaches the outlet valve 63, the position of the outlet valve 63 is changed, so that the outlet duct 14 is blocked, and the milk froth is allowed to flow towards an end of the central duct 13, where it is discharged in the receptacle which has been placed on the cup support 51. The flow of milk froth is continued until a predetermined quantity of milk froth has been delivered to the receptacle.

The appropriate moment in time for changing the position of the outlet valve 63 may be determined in any suitable way. For example, controlling of the various components of the milk whisking device 1 may be time-based, which is possible in view of the fact that volumes of the various ducts 11, 12, 13, 14, 15, 16 of the duct system 10 may be known, and the flow rate of the various fluids may be known as well, since this is related to properties of the pumping action. In principle, it is possible to have an alternative way of controlling, which requires a use of sensors such as a sensor for detecting a change of the nature of the fluid at the position of the position of the outlet valve 63, but this is not preferred as this involves relatively high costs.

As has been indicated in the foregoing, a cleaning process is performed in the milk whisking device 1 after a process of making a milk product and delivering this milk product to a receptacle has taken place. Preferably, the cleaning process is started automatically, so that there is no need for a user to think of doing so, and there is no risk of omission of the cleaning process. This is important, because if the cleaning process would not be performed, the duct system 10 would get contaminated by milk residues, which grow bad over time and spoil milk products which are made during following uses of the milk whisking device 1.

At the start of a cleaning process, the pump 31 is activated. Furthermore, the milk/cleaning fluid valve 61 is put to a position for closing the milk intake duct 11 and opening the cleaning fluid intake duct 15, so that the supply of milk to the central duct 13 is terminated, and is replaced by a supply of cleaning fluid. However, the position of the outlet valve 63 is maintained, so that the end portion of the central duct 13 is filled with cleaning fluid and a last quantity of the milk product is forced to flow from the central duct 13. As soon as the cleaning fluid reaches an end of the central duct 13, the outlet valve 63 is switched to a position for blocking the end portion of the central duct 13 while opening the outlet duct 14.

At a certain point in time during the process of filling the central duct 13 and the heater 40 which is arranged in the central duct 13 with cleaning fluid, the operation of the pump 31 is reversed, and the milk/cleaning fluid valve 61 is put to a position for opening the milk intake duct 11 and closing the cleaning fluid intake duct 15. Under the influence of the reversed operation of the pump 31, it is achieved that the milk intake duct 11 is filled with cleaning fluid which is drawn from the central duct 13 and the heater 40. In the process, a flow of cleaning fluid to the air intake duct 12 and the cleaning fluid intake duct 15 through the joint duct 16 is prevented by the cleaning fluid/air valve 62.

Preferably, the situation in which the pump 31 is operated in the reversed direction lasts only as long as necessary for filling the milk intake duct 11, wherein the operation of the pump 31 is reversed again and the position of the milk/cleaning fluid valve 61 is changed again just in time for avoiding that the cleaning fluid reaches the milk container 21. As soon as it is realized that the operation of the pump 31 is in the original direction again, and the milk/cleaning fluid valve 61 is in the original position again, the central duct 13 is further filled with cleaning fluid. The operation of the pump 31 is terminated when the front of the cleaning fluid is at the end of the outlet duct 14, i.e. when the central duct 13 is completely filled with the cleaning fluid.

For sake of completeness, it is noted that it is also possible to fill the end portion of the central duct 13 at a later stage, in case it is sure that the receptacle for receiving the milk product has been removed. It is possible to have another drip tray at the cup support 51 besides the above-described drip tray 52 which is positioned at a free end of the outlet duct 15, so that it is not necessary to precisely dose the cleaning fluid, or to have a single drip tray which is large enough to be located both at the end of the outlet duct 14 and at the cup support 51. The device 1 may be equipped with a sensor for detecting the presence of a receptacle, so that an appropriate moment for filling the end portion of the central duct 13 may be determined automatically. Another possibility is that a process of supplying cleaning fluid to the end portion of the central duct 13 is only carried out when the device 1 is shut down, wherein it is assumed that at that moment, the receptacle has been removed from the cup support 51, so that any excess cleaning fluid flowing from the central duct 13 is received by the drip tray.

An important advantage of the milk whisking device 1 according to the present invention resides in the fact that a cleaning action of the device 1 leads to a state of the duct system 10 in which all of the ducts 11, 12, 13, 14, 15, 16 are filled with cleaning fluid, wherein it is sufficient to use a single, bi-directional pump. Furthermore, the pump 31 and the heater 40 are always filled with cleaning fluid as well, and it is also ensured that any milk residue is rinsed off the valves 61, 62, 63. Therefore, the milk whisking device 1 is most hygienic. What's more, there is a no need for a user to perform any cleaning action, so that the device 1 is also most convenient in use.

In an alternative embodiment, which is not shown in FIG. 1, the milk whisking device 1 according to the present invention may comprise a sieve which is arranged at the end of the central duct 13. Use of such a sieve in a device without a cleaning function as the device 1 according to the present invention would generate problems concerning cleaning of the sieve. However, such problems are absent in the device 1 according to the present invention, wherein no cleaning effort is required from a user.

By using a sieve, it is achieved that a size of bubbles of the milk froth is determined by properties of the sieve rather than by a temperature of the frothed milk. The latter is the case when no sieve is present at an outlet where milk froth is emitted. As the properties of the sieve are a fact, whereas the temperature may vary and deviate from an optimal value, the use of a sieve is advantageous, as the bubble size may be accurately controlled. More constant froth quality can be realized in this way.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary In the foregoing, a device 1 which is suitable to be used for whisking milk has been disclosed. The device 1 comprises a duct system 10 having an intake duct 11 for taking in milk, an intake duct 15 for taking in a cleaning fluid, and a central duct 13 in which both the milk intake duct 11 and the cleaning fluid intake duct 15 are merging, and further comprises a pump 31 which is arranged in the central duct 13. After the device 1 has been operated for making a milk product, a cleaning action is performed, wherein both the central duct 13 and the milk intake duct 11 are filled with the cleaning fluid. In particular, the pump 31 is a bi-directional pump, wherein filling the central duct 13 with the cleaning fluid is realized by operating the pump 31 in one direction while blocking the milk intake duct 11, and wherein filling the milk intake duct 11 with the cleaning fluid is realized by opening the milk intake duct 11 and operating the pump 31 in a reversed direction, wherein cleaning fluid is displaced from the central duct 13 to the milk intake duct 11. As soon as the milk intake duct 11 is filled with cleaning fluid, the direction of the operation of the pump 31 is changed to the original direction, and the milk intake duct 11 is blocked, so that a complete filling of the central duct 13 with the cleaning fluid may be realized.

The invention claimed is:

1. A device suitable for whisking milk, the device comprising:
   a duct system having a milk intake duct for taking in milk,
   a cleaning fluid intake duct for taking in a cleaning fluid, and
   a central duct in which both the milk intake duct and the cleaning fluid intake duct are merging,
   a first valve capable of switching between a first and second position where the first position selectively blocks the milk intake duct at a position between a milk reservoir and the central duct and leaves the cleaning fluid intake duct open, and where the second position selectively blocks the cleaning fluid intake duct between a cleaning fluid reservoir and the central duct and leaves the milk intake duct open, and
   a pump which is arranged in the central duct, and which is a bi-directional pump
   an air intake duct for taking in air, which merges in the central duct at the same position as the cleaning fluid intake duct, wherein a portion of the cleaning fluid intake duct and a portion of the air intake duct are joined to one duct, and wherein a single-directional check valve is arranged in this one duct.

2. Device according to claim 1, further comprising a sieve which is arranged at an outlet of the duct system.

3. Device according to claim 1, further comprising an outlet duct which is merging into the central duct the outlet duct merging into the central duct on one side of the pump and the air intake duct and the milk intake duct and the cleaning fluid intake duct merging into the central duct on another side of the pump, and a second valve which is a single direction valve and is positioned in one of the outlet duct or the central duct and is capable of blocking one of the outlet duct and the central duct at a position downstream of the merging of the outlet duct to the central duct while leaving another of these ducts open.

4. Device according to claim 3, further comprising a drip tray for receiving waste fluid, wherein one of the central duct and the outlet duct is arranged for emitting the waste fluid to the drip tray, and wherein a sieve is arranged in another of the central duct and the outlet duct.

5. Device according to claim 1, further comprising heating means which are arranged in the central duct.

6. A method for cleaning a device suitable for whisking milk, the device comprising a duct system having a milk intake duct for taking in milk, a cleaning fluid intake duct for taking in a cleaning fluid, and a central duct into which both the milk intake duct and the cleaning fluid intake duct are merging, a first valve capable of switching between a first and second position where the first position selectively blocks the milk intake duct at a position between a milk reservoir and the central duct and leaves the cleaning fluid intake duct open, and where the second position selectively blocks the cleaning fluid intake duct between a cleaning fluid reservoir and the central duct and leaves the milk intake duct open, and a pump which is arranged in the central duct, and which is a bi-directional pump, the milk intake duct and the cleaning fluid intake duct up to their merging into the central duct defines an intake side of the duct system and the central duct from the merging up to an outlet of the central duct defines an outlet side of the duct system, the method comprising:
   at a first cleaning stage:
     i) operating the pump to perform a pumping action in a first direction from an intake side of the duct system to an outlet side of the duct system,
     ii) placing the first valve at a first position for blocking the milk intake duct,
   at a second cleaning stage:
     i) operating the pump in a reversed direction from an intake side of the duct system to an outlet side of the duct system,
     ii) placing the first valve at a second position for allowing the cleaning fluid in the central duct to pass into the milk intake duct, and
   at a third cleaning stage:
     i) operating the pump in the original direction again,
     ii) placing the first valve back to the first position for blocking the milk intake duct again.

7. A method according to claim 6, wherein, in the second cleaning stage, the pump is only operated for pumping a volume of cleaning fluid which corresponds to the volume of the milk intake duct, and wherein the operation of the pump is reversed as soon as this volume has passed the pump.

* * * * *